United States Patent
Lee et al.

(10) Patent No.: US 8,279,381 B2
(45) Date of Patent: Oct. 2, 2012

(54) LIQUID CRYSTAL DISPLAY AND FABRICATING METHOD THEREOF

(75) Inventors: Changdeok Lee, Cheongju-si (KR); Hyungbeom Shin, Daegu (KR); Seok Kim, Jung-ri (KR)

(73) Assignee: LG Display Co., Ltd., Seoul (KR)

( * ) Notice: Subject to any disclaimer, the term of this patent is extended or adjusted under 35 U.S.C. 154(b) by 638 days.

(21) Appl. No.: 12/499,586

(22) Filed: Jul. 8, 2009

(65) Prior Publication Data

US 2010/0128209 A1 May 27, 2010

(30) Foreign Application Priority Data

Nov. 25, 2008 (KR) .................. 10-2008-0117590

(51) Int. Cl.
*G02F 1/1333* (2006.01)
(52) U.S. Cl. .................. 349/110; 349/138; 349/106
(58) Field of Classification Search .................. 349/106, 349/110, 138, 155, 156
See application file for complete search history.

(56) References Cited

U.S. PATENT DOCUMENTS

| | | | |
|---|---|---|---|
| 7,643,110 B2 * | 1/2010 | Kawashima et al. | 349/106 |
| 2009/0015763 A1 * | 1/2009 | Woo et al. | 349/106 |

FOREIGN PATENT DOCUMENTS

| | | |
|---|---|---|
| CN | 1821819 A | 8/2006 |
| KR | 1020080056889 A | 6/2008 |

OTHER PUBLICATIONS

Office Action issued in corresponding Chinese Patent Application No. 200910151497.6, mailed Apr. 25, 2011.

* cited by examiner

*Primary Examiner* — Thoi Duong
(74) *Attorney, Agent, or Firm* — Brinks Hofer Gilson & Lione

(57) ABSTRACT

A liquid crystal display is disclosed. The liquid crystal display includes an upper substrate on which barrier ribs are formed to limit a view angle within sub-pixels; a lower substrate facing the upper substrate; and a liquid crystal layer formed between the upper substrate and the lower substrate.

7 Claims, 10 Drawing Sheets

LIQUID CRYSTAL DISPLAY AND FABRICATING METHOD THEREOF

RELATED APPLICATIONS

This application claims the benefit of Korea Patent Application No. 10-2008-0117590 filed on Nov. 25, 2008, which is incorporated herein by reference for all purposes as if fully set forth herein.

BACKGROUND

1. Field

This disclosure relates to a liquid crystal display and a fabricating method thereof.

2. Discussion of the Related Art

Active matrix driving-type liquid crystal displays (LCDs) display an image by adopting thin film transistors (hereinafter, referred to as "TFT") as switching elements. Liquid crystal displays may be made more compact than cathode ray tubes (CRTs) and thus may be applicable to portable information appliances, office devices, computers, etc. Liquid crystal displays may be also employed for televisions as an alternative to CRTs and such CRTs have been rapidly replaced by LCDs.

A liquid crystal display has been used as a display component that outputs video data in portable information appliances such as mobile phones and laptop computers, various types of office machines, auto teller machines (ATMs), ticket vending machines, etc. Since personal information needs to be protected in personal portable information appliances, ATMs, and ticket vending machines, these devices require a high level of security. For this purpose, there has been a technology to limit the view angle of a liquid crystal display.

As technologies to limit the view angle, there have been suggested a method of detachably arranging a view angle limitation film separately manufactured before the screen of a liquid crystal display as necessary in an international application No. PCT/US2006/040684 (Oct. 13, 2006), and a method of forming pixels for controlling the view angle within a liquid crystal panel in Korean Patent Application Publication No. 2007-0032192A (Mar. 21, 2007). However, the former method has problems in that it is difficult to manufacture the view angle limitation film, the view angle limitation is expensive, and it may cause users to feel more inconvenient since repetitive attachment and detachment of the view angle limitation film in front of the liquid crystal panel is required whenever it is needed to implement a narrow view angle. The latter method has many advantages over the former method, however, it still has a shortcoming that light transmittance may be reduced due to existence of pixels for controlling the view angle.

BRIEF SUMMARY

An exemplary embodiment provides a liquid crystal display and a fabricating method thereof, which may implement a narrow view angle without a view angle limitation film and view angle limitation pixels.

In an aspect, there is provided a liquid crystal display including: an upper substrate on which barrier ribs are formed to limit a view angle within sub-pixels; a lower substrate facing the upper substrate; and a liquid crystal layer formed between the upper substrate and the lower substrate.

In another aspect, there is provided a fabricating method of a liquid crystal display including: forming barrier ribs on an upper substrate to limit a view angle to be arranged within sub-pixels; and forming a liquid crystal layer between the upper substrate and the lower substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Hereinafter, exemplary embodiments will be described with reference to FIG. 1 to FIG. 10B.

Figure 1:
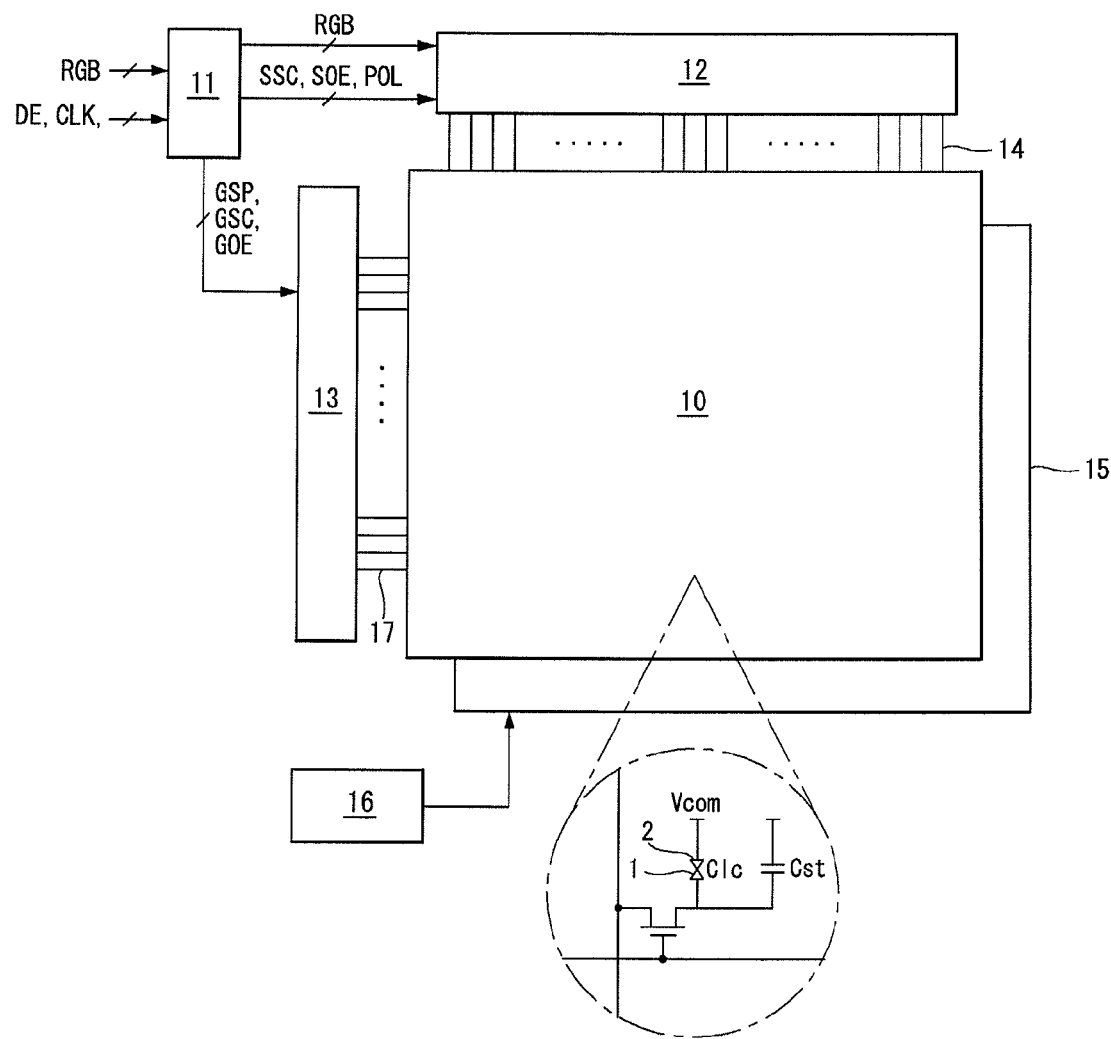
FIG. 1 is a block diagram illustrating a liquid crystal display according to an exemplary embodiment.

Referring to FIG. 1, a liquid crystal display according to an exemplary embodiment includes a liquid crystal panel 10, a timing controller 11, a data driving circuit 12, and a gate driving circuit 13. The data driving circuit 12 includes a plurality of source driving ICs. The gate driving circuit 13 includes a plurality of gate driving ICs.

The liquid crystal display according to the exemplary embodiment further includes a backlight unit 15 directing light toward the liquid crystal panel 10 and an inverter circuit 16 driving a light source of the backlight unit 15.

The liquid crystal panel 10 includes a liquid crystal layer between two sheets of glass substrates. The liquid crystal panel 10 includes liquid crystal cells Cls that are arranged in a matrix pattern by intersection of data lines 14 and gate lines 17.

A pixel array is arranged on the lower glass substrate of the liquid crystal panel 10, which includes the data lines 14, the gate lines 17, TFTs, and a storage capacitor Cst. The liquid crystal cells Clc are connected to the TFTs and driven by electric fields between a pixel electrode 1 and a common electrode 2. A black matrix, a color filter, and a common electrode 2 are arranged on the upper glass substrate of the liquid crystal panel 10. The color filter and the black matrix may be formed on the lower glass substrate along with the pixel array by using a COT (Color Filter on TFT) technology as disclosed in U.S. Pat. No. 7,372,524B2. The common electrode 2 is formed on the upper glass substrate in a vertical electric field driving method such as a twisted nematic (TN) mode and a vertical alignment (VA) mode, and on the lower glass substrate along with the pixel electrode 1 in a horizontal electric field driving method such as an in plane switching (IPS) mode and a fringe field switching (FFS) mode. A polarization plate is attached onto each of the upper glass substrate and the lower glass substrate of the liquid crystal panel 10, and an alignment film is provided to set up a pre-tilt angle of liquid crystal molecules.

The timing controller 11 supplies digital video data RGB to the data driving circuit 12. Further, the timing controller 11 receives timing signals such as data enable signals DE and dot clocks CLK, and generates control signals for controlling operation timing of the data driving circuit 12 and the gate driving circuit 13. The timing controller 11 may count the data enable signal DE to identify between one frame period and one horizontal period. A timing signal of the timing controller 11 may include a vertical synchronization signal Vsync and a horizontal synchronization signal Hsync. The control signals for controlling the operation timing of the driving circuits 12 and 13 include a gate timing control signal for controlling the operation timing of the gate driving circuit 13 and a data timing control signal for controlling the operation timing of the data driving circuit 12 and polarity of a data voltage. The gate timing control signal includes a gate start pulse GSP, a gate shift clock GSC, and gate output enable signals GOE1 to GOE3. The gate start pulse GSP is applied to a gate driving IC that generates a first gate pulse (or scan pulse). The gate shift clock GSC that is a clock signal commonly input to the gate driving ICs is a clock signal for shifting the gate start pulse GSP. The gate output enable signal GOE controls the output of the gate driving ICs. The data timing control signal includes a source sampling clock SSC, a polarity control signal POL, and a source output enable signal SOE. The source sampling clock SSC is a clock signal that controls the sampling operation of data in the data driving circuit 12 based on a rising edge or falling edge. The polarity control signal POL controls a vertical polarity of a data voltage output from the data driving circuit 12. The source output enable signal SOE controls the output to the data driving circuit 12.

Each of the data driving ICs of the data driving circuit 12 includes a shift register, a latch, a digital-analog converter, and an output buffer. The data driving circuit 12 latches digital vide data RGB under control of the timing controller 11. The data driving circuit 12 converts the digital video data RGB to an analog positive/negative gamma compensation voltage according to the polarity control signal POL, generates a positive/negative analog data voltage, and supplies the data voltage to the data lines 14.

The gate driving circuit 13 includes a shift register, a level shifter, and an output buffer. The gate driving circuit 13 sequentially supplies a gate pulse to the gate lines 17 in response to the gate timing control signals.

The backlight unit 15 may be implemented as an edge-type backlight unit or a direct-type backlight unit. An edge-type backlight unit includes a light source located opposite to a side of a guide plate, a reflection sheet arranged under the guide plate, and a plurality of optical sheets laminated on the guide plate. A direct-type backlight unit includes a plurality of light sources, a diffusion plate arranged over a bottom cover, and a plurality of optical sheets laminated over the diffusion plate. An optical sheet includes a diffusion sheet and a prism sheet. A light source may be implemented as a fluorescent lamp such as cold cathode fluorescent lamp (CCFL), and external electrode fluorescent lamp (EEFL), or a light emitting diode (LED). Further, a light source may be configured as a combination of a lamp and a light emitting diode. The inverter circuit 16 generates power for the light source.

A fabricating method of a liquid crystal display according to an exemplary embodiment includes a substrate washing process, a substrate patterning process, an alignment film forming/rubbing process, a substrate attachment and liquid crystal dropping process, a driving circuit mounting process, a testing process, a repairing process, and a process of assembling the liquid crystal panel 10 and the backlight unit 15.

The substrate washing process removes contaminated, unwanted material with a washing liquid from the surface of the upper glass substrate and the lower glass substrate of the liquid crystal panel 10. The substrate patterning process includes a lower plate fabrication process that prepares various materials for thin film such as signal lines, including data lines and gate lines, thin film transistors (TFTs), and pixel electrodes on the lower glass substrate and patterns them, and an upper plate fabrication process that prepares various materials for thin film such as a black matrix, a color filter, and a common electrode on the upper glass substrate and patterns them. The alignment film forming/rubbing process applies an alignment film onto the glass substrates and rubs the alignment film with a rubbing fabric or performs an optical alignment treatment on the alignment film. Through the above series of processes, there are formed on the lower glass substrate of the liquid crystal panel 10 a TFT array and pixels including data lines supplying a vide data voltage, gate lines intersecting the data lines to sequentially supply a scan signal, i.e. gate pulse, TFTs arranged at intersections of the data lines and gate lines, pixel electrodes of liquid crystal cells connected to the TFTs in a one-to-one manner, and a storage capacitor. The shift register of the gate driving circuit that generates a scan signal may be prepared along with the pixels and TFT array in the substrate patterning process. A black matrix, a color filter, and a common electrode are formed on the upper glass substrate of the liquid crystal panel. As mentioned above, the black matrix and the color filter may be also formed on the lower glass substrate in a COT process. A polarization plate is provided at each of the upper glass substrate and the lower glass substrate, and a protection film is attached onto the polarization plate.

The substrate attachment and liquid crystal dropping process draws a sealant to one of the upper and lower glass substrates of the LCD panel and drops liquid crystal onto the other. In an example of dropping liquid crystal onto the lower glass substrate, a UV (Ultra Violet)-cured sealant is applied onto the upper glass substrate, the upper glass substrate on which the sealant is applied is rotated and fixed, and then the lower glass substrate to which liquid crystal is dropped is fixed on a lower stage. Subsequently, the substrate attachment and liquid crystal dropping process pressurizes one of the upper glass substrate and the lower glass substrate in a vacuum condition created by driving a vacuum pump with the upper and lower glass substrates aligned. At this time, the cell gap of the liquid crystal layer is set to be greater than a cell gap of a predetermined designed value. Then, if nitrogen N2 is injected and the pressure is adjusted as the atmosphere pressure, the cell gap is adjusted to be equal to the cell gap of the designed value by difference in pressure between the pressure in the attached glass substrates and external atmospheric pressure. Under this condition, the substrate attachment and liquid crystal dropping process lights up an ultraviolet light source and illuminates the sealant with ultraviolet rays through the upper glass substrate.

The driving circuit mounting process mounts an integrated circuit (IC) for a data driving circuit on the lower glass substrate of the liquid crystal panel using a chip-on-glass (COG) process or tape automated bonding (TAB) process. The gate driving circuit IC may be formed on the lower glass substrate of the liquid crystal panel as described above or attached on the lower glass substrate by a TAB process in the driving circuit mounting process. Subsequently, the driving circuit mounting process connects the IC and printed circuit board (PCB) to a flexible printed circuit (FPC) board or flexible flat cable (FFC).

The testing process includes testing the IC, testing signal lines such as the data lines and gate lines formed on the lower glass substrate, a test executed after formation of the pixel electrodes, a test performed after the substrate attachment and liquid crystal dropping process, and a lighting test. The repair process carries out a recovering process for signal line failures and TFT failures determined to be capable of being repaired by the testing process.

The fabricating method of the liquid crystal display according to exemplary embodiments assembles the liquid crystal panel 10 and the backlight unit 15 as a single module after the above series of processes.

FIGS. 2A to 2D are views sequentially illustrating a process of producing the upper plate of the liquid crystal display according to a first exemplary embodiment.

The process of producing the upper plate includes forming a plurality of barrier ribs BAR between black matrixes BM simultaneously with forming the plurality of black matrixes BM on a glass substrate GLS. The black matrixes BM provided between color filters serve to block light. The black matrixes BM are formed at the boundary of RGB sub-pixels and the boundary between pixels. Whereas the black matrix BM is formed at the RGB sub-pixels and the boundary between the pixels, the barrier ribs BAR are formed within the sub-pixels. The interval between the barrier ribs BAR is narrower than the interval between the black matrixes BM. The height of the barrier rib is subsequently identical to the height of the black matrix BM pattern, and the width of the barrier rib BAR is narrower than the width of the black matrix BM pattern. The barrier ribs BAR function to limit the view angle. The principle of limiting the view angle with the barrier ribs BAR will be detailed with reference to FIG. 7.

The black matrixes BM and the barrier ribs BAR contain the same material and are simultaneously formed by the same process. The black matrixes BM and the barrier ribs BAR may include a metallic black matrix material such as Cr, Cr/CrOx, etc. and may further include a resin black matrix material obtained by mixing Cr-based metallic material or carbon-based organic material with photoresist containing an optical polymerization initiator, a binder resin, a high molecular monomer, and a solvent. Besides, the black matrixes BM and the barrier ribs BAR may include any known black matrix material such as an organic material containing carbon black, a black matrix resin material using a mixing metal oxide, and a black matrix resin using an inorganic material. These black matrixes BM and the barrier ribs BAR may be formed in a photolithography process or lift-off process according to its material.

Figure 2A:
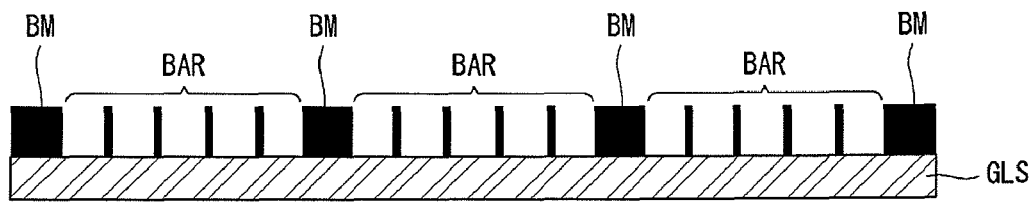
FIGS. 2A to 2D are views illustrating a process of producing an upper plate of a liquid crystal display according to a first exemplary embodiment.
Figure 2B:
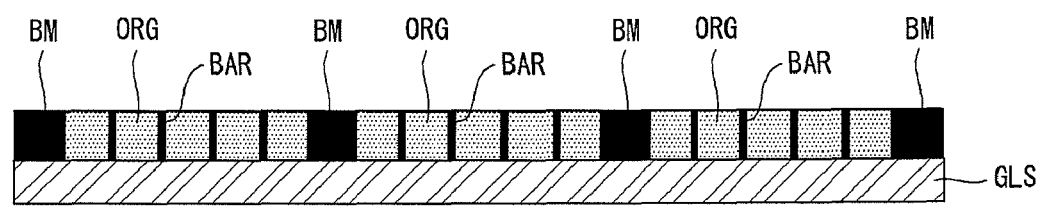

The upper plate production process includes a process of preparing a transparent organic insulating film ORG on the black matrixes BM and the barrier ribs BAR after forming the black matrixes BM and the barrier ribs BAR as shown in FIG. 2B. In this process, the barrier ribs BAR are embedded in the organic insulating film ORG. The organic insulating film ORG may be formed of at least any one of polyimide-based organic compound, acrylic-based organic compound, benzo-cyclo-butene (BCB), and perfluorocyclobutane (PFCB). The organic insulating film ORG may be formed on the black matrixes BM and the barrier ribs BAR in a spin coating process or known organic material printing method. The organic insulating film ORG plays a role to transmit the light and firmly support the barrier ribs BAR. Further, the organic insulating film ORG flattens the surface so that color filters may be uniformly formed in the color filter producing process that will be described later.

Figure 2C:
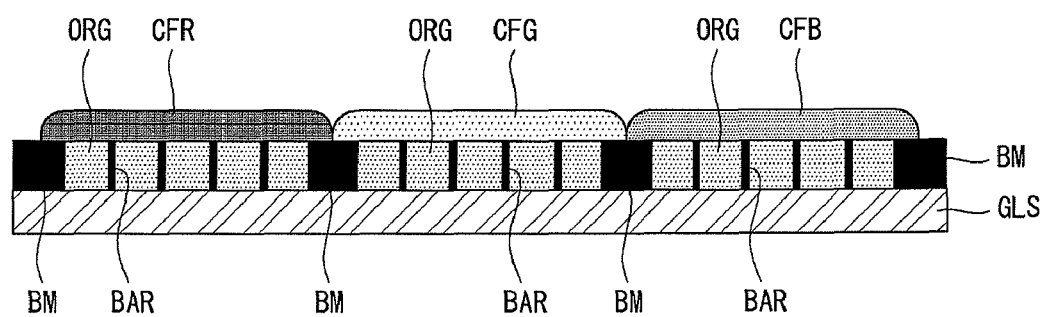

In the upper plate producing process, RGB color filters CFR, CFG, and CFB are formed on the organic insulating film ORG after the formation of the organic insulating film ORG as shown in FIG. 2C. The color filters CFR, CFG, and CFB include a resin containing a RGB dye or pigment, and may be formed in a dyeing method, an electrodeposition method, a pigment-dispersed method, and a printing method.

Figure 2D:
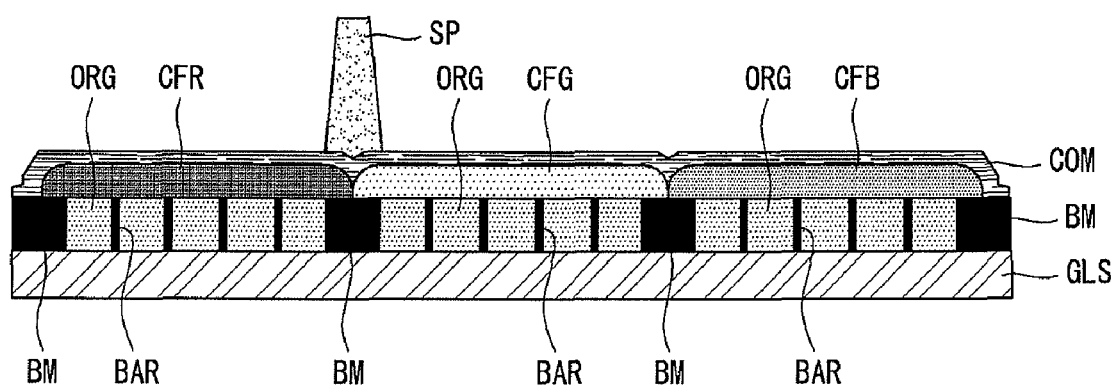

Subsequently, the upper plate producing process forms a common electrode COM on the color filters CFR, CFG, and CFB in a deposition method such as sputtering as shown in FIG. 2D, prints an organic insulating material on the common electrode COM, and patterns the organic insulating material by photolithography to form a column spacer SP. The common electrode COM contains a transparent conductive material such as indium tin oxide (ITO) and indium zinc oxide (IZO) and is supplied with a common voltage Vcom. The column spacer SP is a structure maintaining the cell gap of the liquid crystal layer.

Figure 3A:
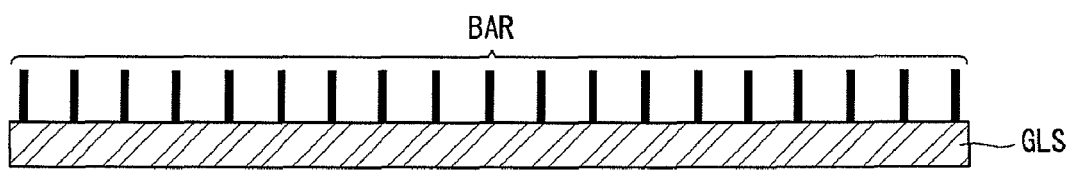
FIGS. 3A to 3C are views illustrating a process of producing an upper plate of a liquid crystal display according to a second exemplary embodiment.
Figure 3B:
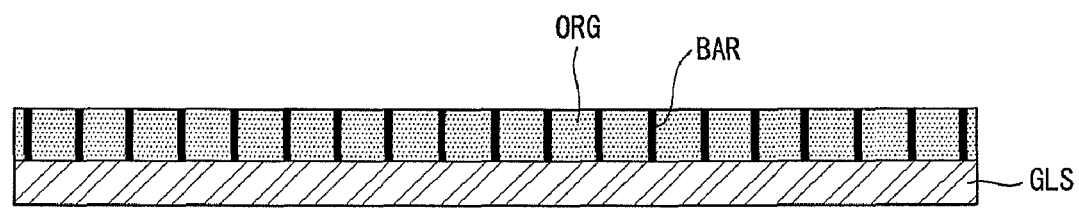
Figure 3C:
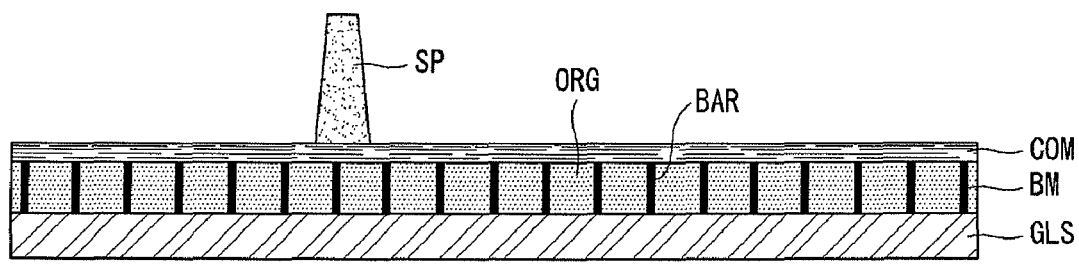

FIGS. 3A to 3C are views sequentially illustrating a process of producing an upper plate of a liquid crystal display according to a second exemplary embodiment. This upper plate producing process may be applied to an LCD panel of which the color filter and the black matrix are formed on the lower glass substrate along with the pixel array but not on the upper glass substrate in a COT processing technology.

Referring to FIGS. 3A to 3C, the upper plate producing process includes a step of preparing a plurality of barrier ribs BAR on the upper glass substrate GLS. The black matrix BM is provided at the boundary of the RGB sub-pixels and at the boundary between the pixels. On the contrary, the barrier ribs BAR are formed within the sub-pixels. The interval between the barrier ribs BAR is narrower than the interval between the black matrixes BM. The height of the barrier rib BAR is substantially identical to the height of the black matrix BM pattern formed on the lower glass substrate, and the width of the barrier rib BAR is narrower than the width of the black matrix BM pattern. The barrier ribs BAR serve to limit the view angle. The principle of limiting the view angle will be described in detail with reference to FIG. 7. The barrier ribs BAR include the material of the black matrix BM and may be formed by lithography or in a lift-off process depending on its material.

The upper plate producing process forms the organic insulating film ORG on the barrier ribs BAR after the formation of the barrier ribs BAR as shown in FIG. 3B. In this process, the barrier ribs BAR are embedded in the organic insulating film ORG. The organic insulating film ORG transmits light and firmly supports the barrier ribs BAR. In addition, the organic insulating film ORG flattens the surface to uniformly form the common electrode COM to be formed in the color filter process which will be described later.

After the formation of the organic insulating film ORG, the upper plate producing process forms the common electrode COM on the organic insulating film ORG with transparent conductive material and then patterns an organic insulating material on the common electrode COM to form a column spacer SP as shown in FIG. 3C.

Figure 4:
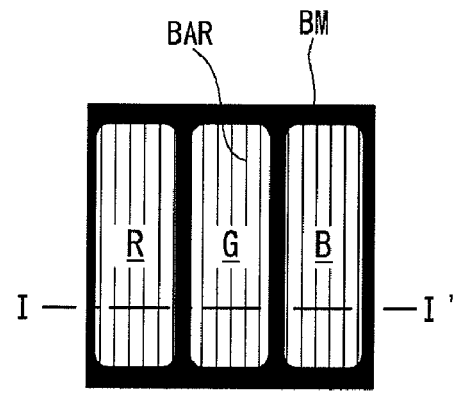
FIG. 4 is a plan view of barrier ribs.
Figure 5:
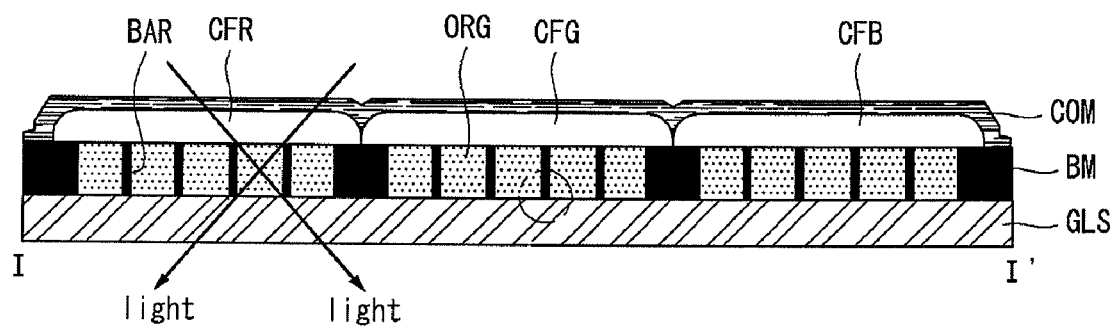
FIG. 5 is a cross section view taken along line I-I' at a pixel of barrier ribs.
Figure 6:
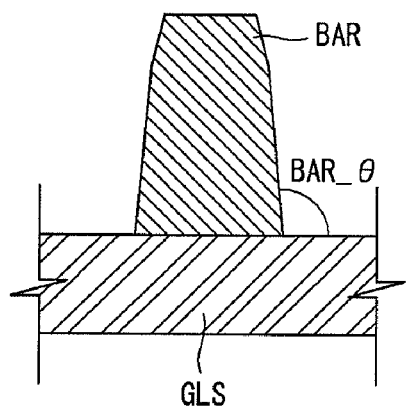
FIG. 6 is an expanded section view of the barrier rib.

FIGS. 4 to 6 depict a cross section view taken along line I-I' at a pixel, a plan view, and an expanded cross section view of a barrier rib. The angle BAR_θ between the barrier rib BAR and the upper glass substrate GLS may be formed as angle so that the light passing through the upper glass substrate may have the minimum lowering in brightness and limit the view angle. For this purpose, the angle BAR_θ between the barrier rib BAR and the upper glass substrate GLS may range between 90°~150° as shown in FIGS. 4 to 6 considering equipment for current processes and fabrication errors.

Figure 7:
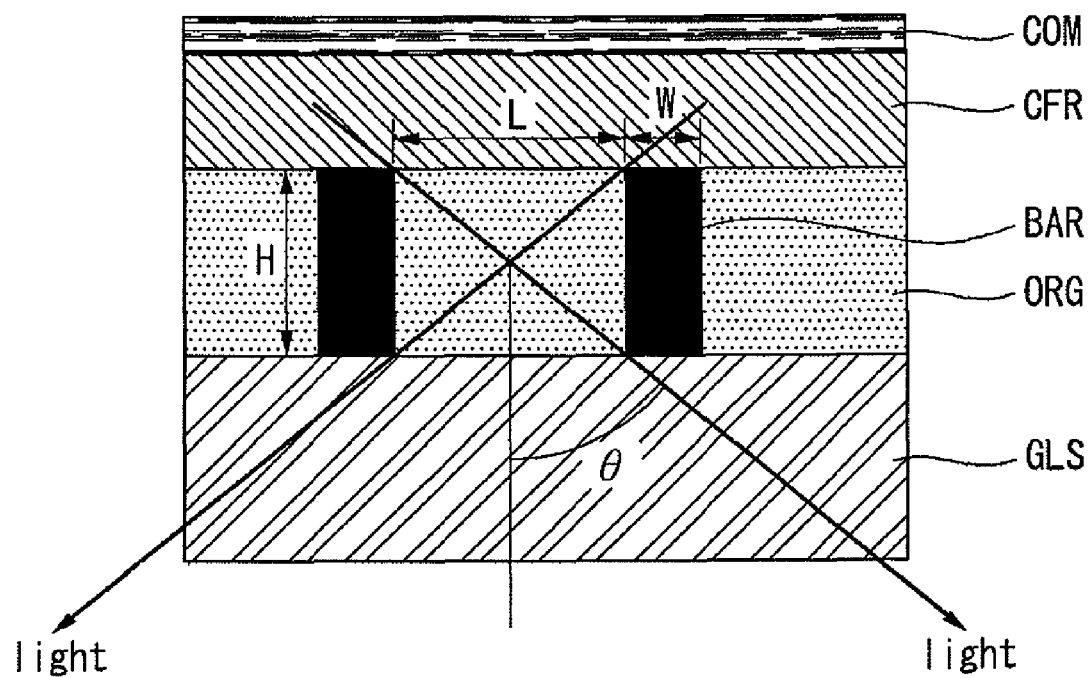
FIG. 7 is a view illustrating a principle of limiting the view angle by barrier ribs.

FIG. 7 is a view illustrating the principle of limiting the view angle due to the barrier ribs BAR.

Assuming that the height of the barrier rib BAR is 'H', the width of the barrier rib BAR is 'W', and the interval between the barrier ribs BAR is 'L', the angle of light traveling through the upper glass substrate GLS, i.e. the view angle E may be adjusted depending on 'H' and 'L' in Equation 1 as below:

$$\theta = \tan^{-1}\left(\frac{H}{L}\right) \quad \text{[Equation 1]}$$

When 'H' are 'W' are equal to each other, the view angle θ of the liquid crystal display becomes 45 degrees. Meanwhile, when the barrier rib is buried not in the organic insulating film ORG but in the color filter CFR, CFG, and CFB, the color filter having color may be seen from sections of any directions, and thus, it is impossible to narrow the view angle, and when the liquid crystal layer is disregarded, the view angle θ becomes 180 degrees. Accordingly, the barrier ribs BAR need to be buried in a transparent medium to narrow the view angle.

Figure 8A:
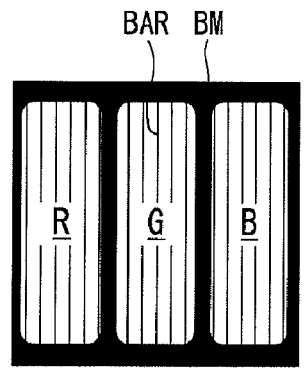
FIGS. 8A to 8F are plan views illustrating various patterns of barrier ribs.
Figure 9A:
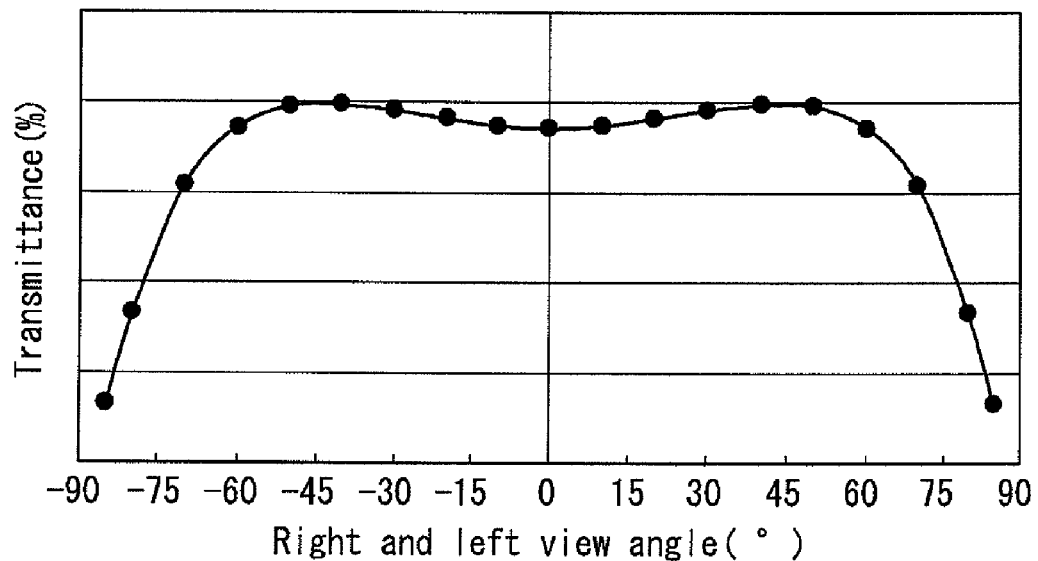
FIGS. 9A and 9B are graphs illustrating view angles and transmittance characteristics in a TN-mode liquid crystal display according to the prior art.
Figure 9B:
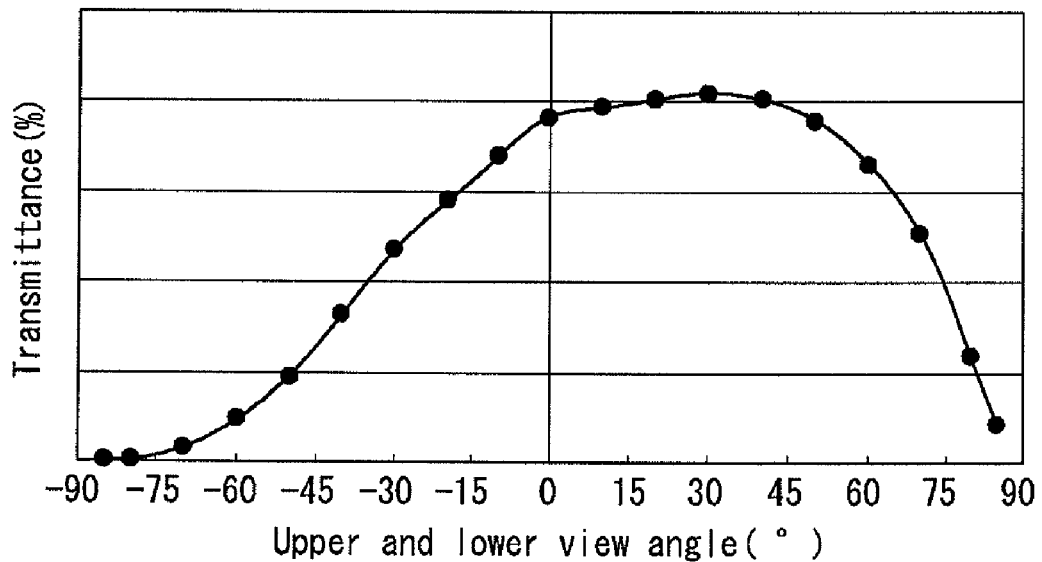
Figure 10A:
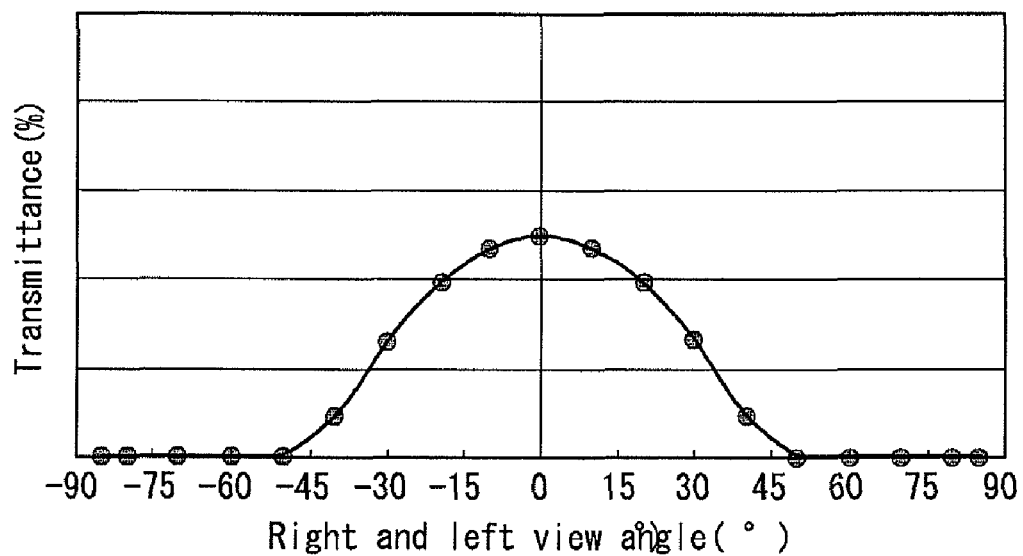
FIGS. 10A and 10B are graphs illustrating experimental results regarding view angles and transmittance characteristics in a liquid crystal display according to an exemplary embodiment.
Figure 10B:
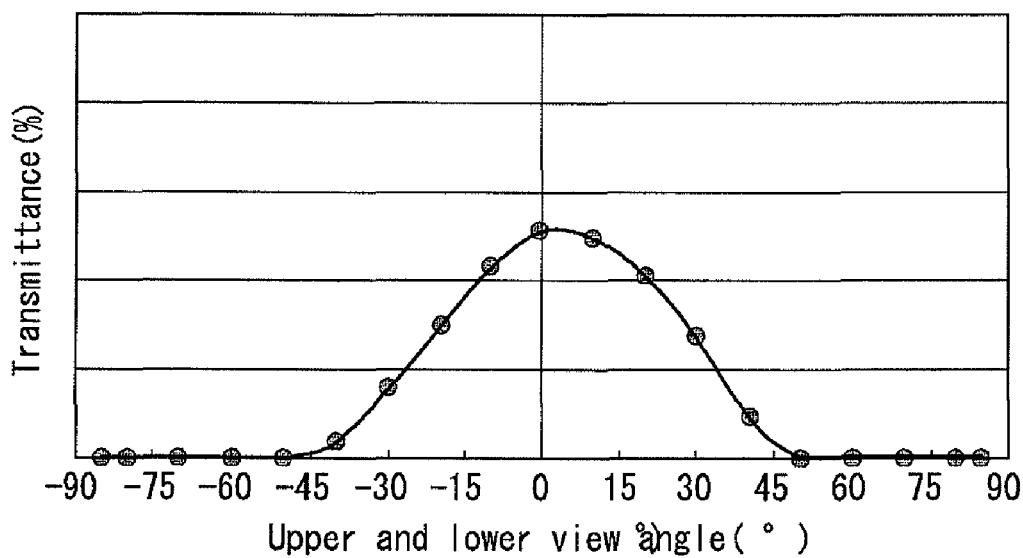

The exemplary embodiment allows the view angle to be narrowed by using the barrier ribs BAR. FIGS. 9A and 9B are graphs illustrating a relationship between view angles and transmittance in left and right and upper and lower view angles of a general TN mode. In FIGS. 9A and 9B, the prior art has an upper and lower view angle of about −40°~75° and a left and right view angle of −75°~75°. By contrast, the inventors of this application found that both the left and right view angle and the upper and lower view angle may be prominently reduced compared to the existing TN mode as shown in FIGS. 10A and 10B from the results of view angle-transmittance experiments. FIG. 10A is a graph illustrating a result of left and right view angles-transmittance experiments under the condition of H=L=0.5 W when the construction shown in FIG. 8A is applied, and the exemplary embodiment may implement as narrow left and right view angle as −40°~40° as shown in FIG. 10A. FIG. 10B is a graph illustrating a result of left and right view angles-transmittance experiments under the condition of H=L=0.5 W when the construction shown in FIG. 6B is applied, and the exemplary embodiment may implement as narrow left and right view angle as −25°~40° as shown in FIG. 10A. The view angles shown in FIGS. 10A and 10B may be further narrowed by adjusting the height H and the width L of the barrier ribs BAR.

Figure 8B:
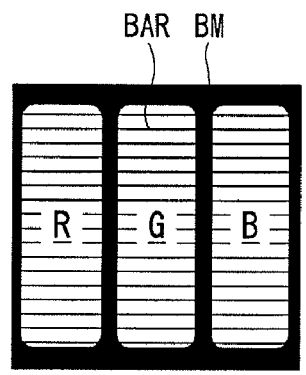
Figure 8C:
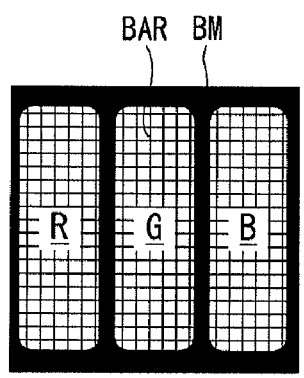
Figure 8D:
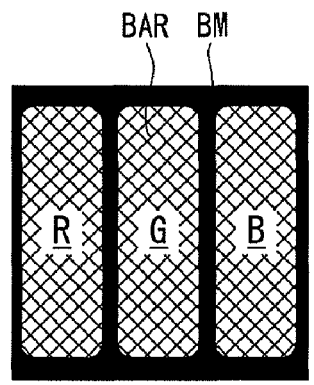
Figure 8E:
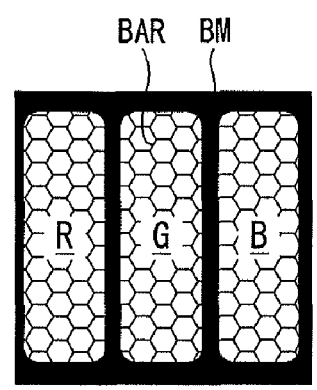
Figure 8F:
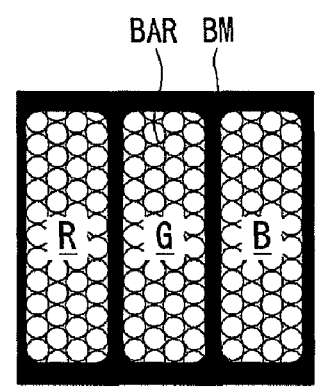

FIGS. 8A and 8F are plan views illustrating various patterns of barrier ribs BAR.

The barrier ribs BAR may be formed in a vertical stripe pattern as shown in FIG. 8A and a horizontal stripe pattern as shown in FIG. 8B, and may be formed as one of the two stripe patterns depending on a direction intended to limit the view angle. Further, the barrier ribs BAR may be formed as lattice type barrier ribs as shown in FIG. 8C, inclined lattice type barrier ribs as shown in FIG. 8D, and honey comb-type barrier ribs as shown in FIGS. 8E and 8F, and therefore, a narrow view angle may be accomplished from any directions.

As described above, the liquid crystal display and the fabricating method of the same according to the exemplary embodiments may implement the narrow view angle without a separate film for limiting the view angle or pixels for restricting the view angle by forming barrier ribs of black matrix material on the upper glass substrate GLS.

Embodiments of the invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A liquid crystal display comprising:
   an upper substrate on which barrier ribs are formed to limit a view angle within sub-pixels;
   an organic insulating film on the upper substrate, wherein the barrier ribs are buried in the organic insulating film;
   a lower substrate facing the upper substrate;
   a black matrix formed on the upper substrate, wherein the black matrix has the same material as the barrier ribs; and
   a liquid crystal layer between the upper substrate and the lower substrate,
   wherein all of the barrier ribs are spaced apart from the black matrix.

2. The liquid crystal display of claim 1, further comprising:
   a common electrode on the organic insulating film; and
   a spacer on the common electrode.

3. The liquid crystal display of claim 2, further comprising:
   a color filter between the organic insulating film and the common electrode, wherein a width of the barrier rib is narrower than a width of a pattern of the black matrix.

4. A liquid crystal display comprising:
   an upper substrate on which barrier ribs are formed to limit a view angle within sub-pixels;
   an organic insulating film on the upper substrate, wherein the barrier ribs are buried in the organic insulating film;
   a lower substrate facing the upper substrate;
   a liquid crystal layer between the upper substrate and the lower substrate;
   a black matrix formed on the upper substrate, wherein the black matrix has the same material as the barrier ribs; and
   a color filter on the lower substrate,
   wherein all of the barrier ribs are spaced apart from the black matrix.

5. A fabricating method of a liquid crystal display comprising:
   simultaneously forming barrier ribs limiting a view angle to be arranged within sub-pixels, and a black matrix having the same material as the barrier ribs on an upper substrate;
   forming an organic insulating film on the upper substrate, wherein the barrier ribs are buried in the organic insulating film; and
   forming a liquid crystal layer between the upper substrate and a lower substrate,
   wherein all of the barrier ribs are spaced apart from the black matrix.

6. The fabricating method of claim 5, further comprising:
   forming a common electrode on the organic insulating film; and
   forming a spacer on the common electrode.

7. The fabricating method of claim 6, further comprising:
   forming a color filter between the organic insulating film and the common electrode, wherein a width of the barrier rib is narrower than a width of a pattern of the black matrix.

* * * * *